(12) United States Patent
Vianello et al.

(10) Patent No.: US 11,248,414 B2
(45) Date of Patent: Feb. 15, 2022

(54) DOSAGE DEVICE FOR CONTINUOUSLY EXTRUDING AND APPLYING A SPACER PROFILE OF AN INSULATING GLAZING UNIT

(71) Applicant: FOREL SPA, Frazione Vallio (IT)

(72) Inventors: Fortunato Vianello, Frazione Vallio (IT); Riccardo Vianello, Frazione Vallio (IT)

(73) Assignee: FOREL SPA, Frazione Vallio (IT)

( * ) Notice: Subject to any disclaimer, the term of this patent is extended or adjusted under 35 U.S.C. 154(b) by 0 days.

(21) Appl. No.: 15/668,443

(22) Filed: Aug. 3, 2017

(65) Prior Publication Data
US 2018/0038154 A1 Feb. 8, 2018

(30) Foreign Application Priority Data
Aug. 4, 2016 (IT) .......................... 102016000082082

(51) Int. Cl.
| | |
|---|---|
| E06B 3/673 | (2006.01) |
| E06B 3/663 | (2006.01) |
| B05C 5/02 | (2006.01) |
| B29C 31/04 | (2006.01) |
| B29C 31/10 | (2006.01) |

(Continued)

(52) U.S. Cl.
CPC ........ *E06B 3/67365* (2013.01); *B05C 5/0216* (2013.01); *B29C 31/042* (2013.01); *B29C 31/10* (2013.01); *B29C 48/266* (2019.02); *E06B 3/66309* (2013.01); *E06B 3/67347* (2013.01); *B05C 11/1036* (2013.01); *B29C 31/045* (2013.01); *B29C 31/06* (2013.01); *B29C 48/362* (2019.02); *B29K 2075/02* (2013.01);

(Continued)

(58) Field of Classification Search
None
See application file for complete search history.

(56) References Cited

U.S. PATENT DOCUMENTS

| | | | |
|---|---|---|---|
| 4,629,410 A | 12/1986 | Hehl | |
| 5,108,526 A * | 4/1992 | Cornils | ................. B05C 5/0216 156/108 |

(Continued)

FOREIGN PATENT DOCUMENTS

| | | |
|---|---|---|
| DE | 102007051610 A1 | 4/2009 |
| DE | 102009024939 A1 | 12/2010 |

(Continued)

*Primary Examiner* — Jethro M. Pence
(74) *Attorney, Agent, or Firm* — Cantor Colburn LLP

(57) ABSTRACT

A dosage device for extruding a monocomponent or a bicomponent polymeric product, particularly for an automatic machine for forming a spacer frame, includes a first dosage assembly and a separate second dosage assembly for the dosage and feeding of the product, which can be activated, in a first feeding step and in a third feeding step, alternately so that one of them provides continuity of flow to an extrusion nozzle while the other one is in the reloading step. The first and second dosage assemblies are activated, in a second swapping step that is intermediate with respect to the first and third feeding steps, simultaneously and jointly, one of them having a flow-rate ramp that passes from the steady-state value to zero and the other one complementarily having a flow-rate ramp that passes from zero to the steady-state value.

11 Claims, 12 Drawing Sheets

(51) Int. Cl.
*B29C 48/25* (2019.01)
*B29C 31/06* (2006.01)
*B29L 31/00* (2006.01)
*B29K 75/00* (2006.01)
*B29C 48/36* (2019.01)
*B05C 11/10* (2006.01)

(52) U.S. Cl.
CPC ....... *B29L 2031/006* (2013.01); *E06B 3/6733* (2013.01); *E06B 3/67308* (2013.01)

(56) References Cited

U.S. PATENT DOCUMENTS

| | | | |
|---|---|---|---|
| 5,961,759 | A | 10/1999 | Schubert |
| 6,726,773 | B1 * | 4/2004 | Yanagita ................. B05B 9/047 |
| | | | 118/323 |
| 8,480,940 | B2 | 7/2013 | Schuler |
| 9,079,335 | B2 | 7/2015 | Schuler |
| 2011/0001265 | A1 * | 1/2011 | Walia ..................... B01F 5/246 |
| | | | 264/299 |
| 2012/0180936 | A1 | 7/2012 | Schuler |
| 2015/0028055 | A1 * | 1/2015 | Hayama ................. B05C 5/025 |
| | | | 222/55 |

FOREIGN PATENT DOCUMENTS

| | | | | |
|---|---|---|---|---|
| DE | 102009035002 | A1 | 1/2011 | |
| EP | 0823531 | A2 * | 2/1998 | ........... B05C 5/0216 |
| EP | 0823531 | B1 | 10/2001 | |
| EP | 2735418 | A1 | 5/2014 | |
| FR | 2609093 | A2 | 7/1988 | |
| WO | 8806925 | A1 | 9/1988 | |
| WO | 2009053090 | A2 | 4/2009 | |
| WO | 2010142428 | A1 | 6/2010 | |
| WO | 2015113080 | A1 | 8/2015 | |

\* cited by examiner

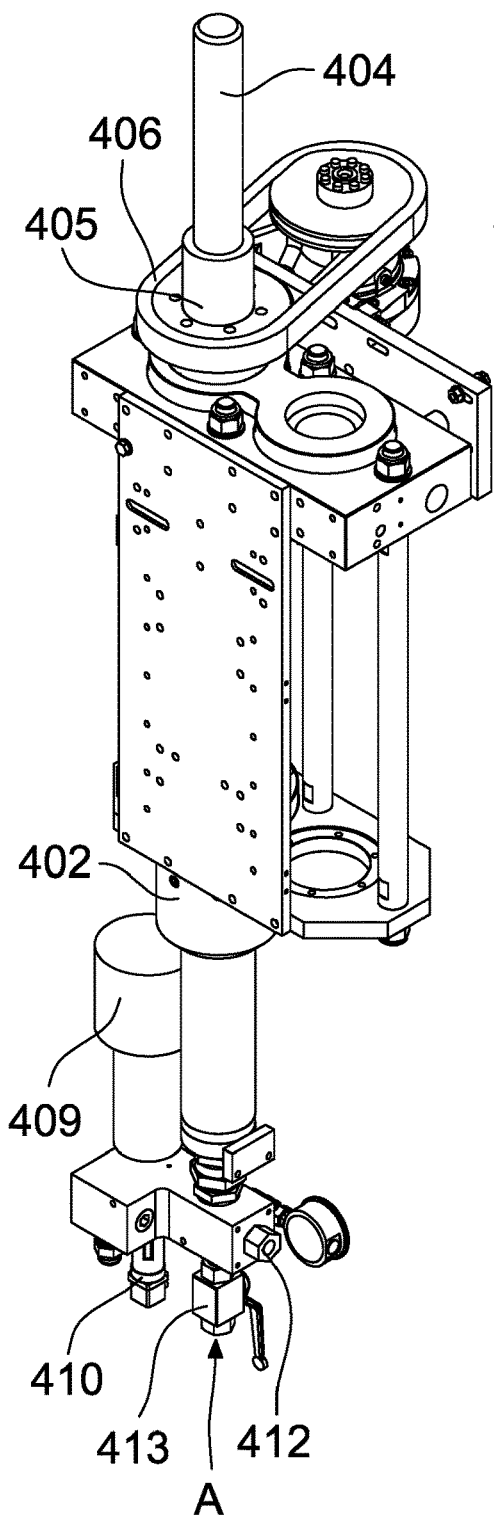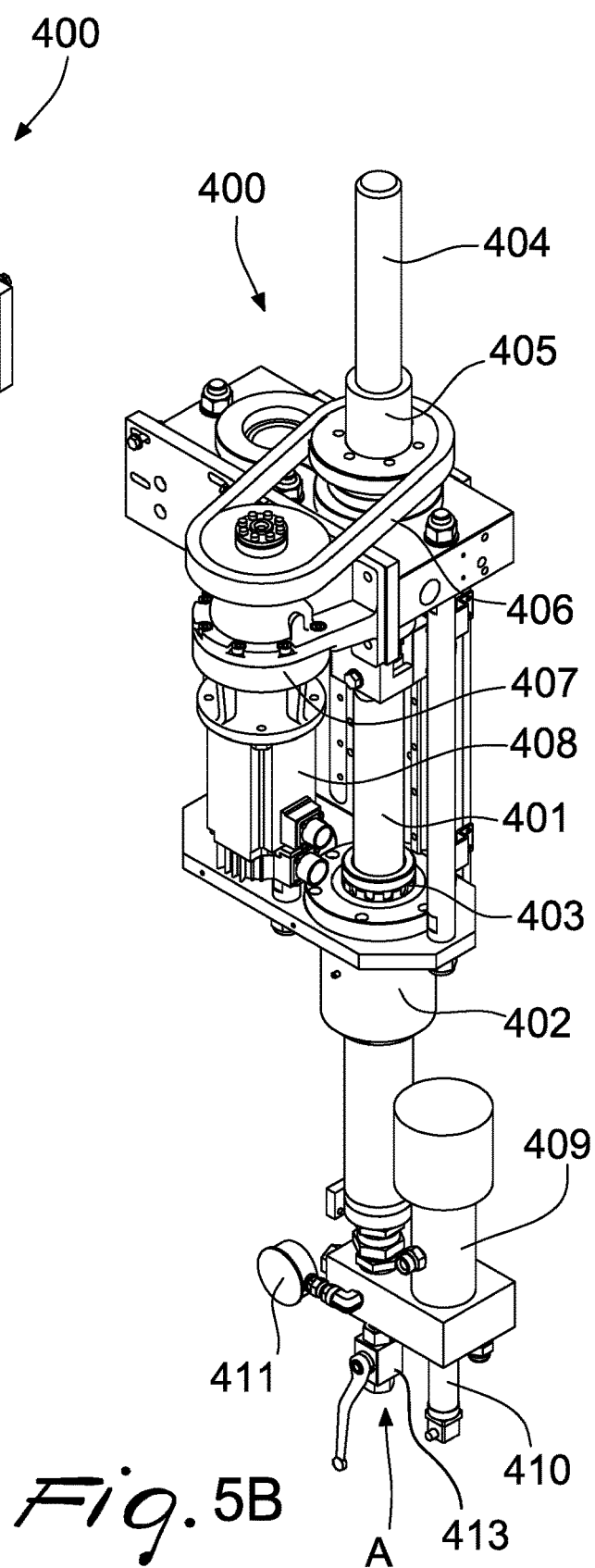
Fig. 5A
Fig. 5B

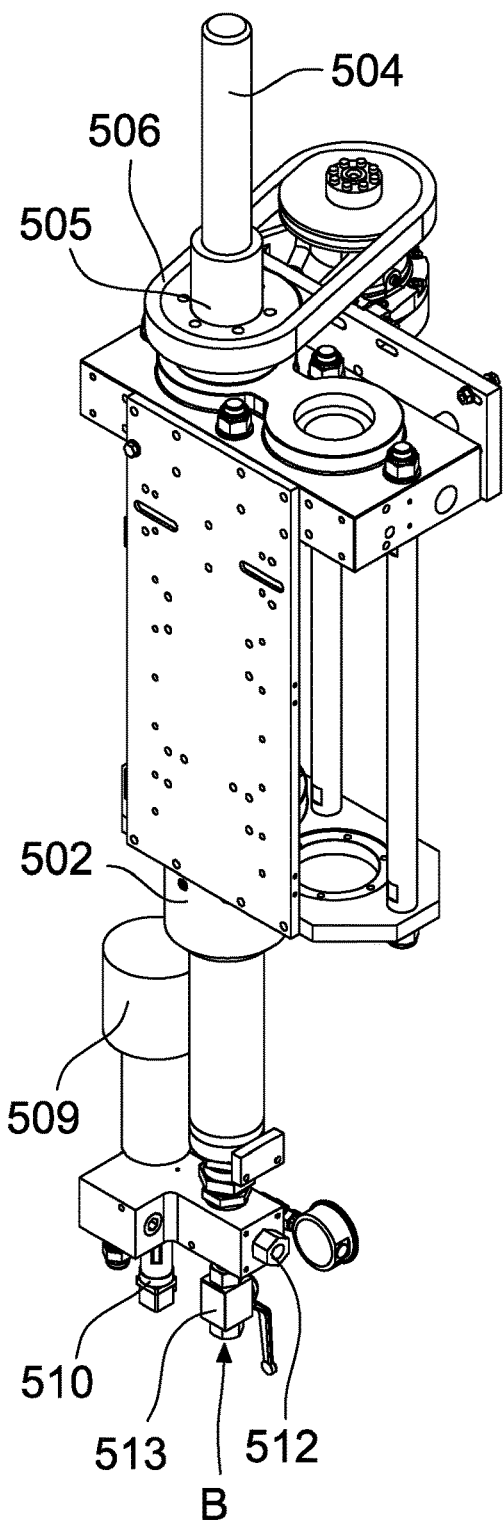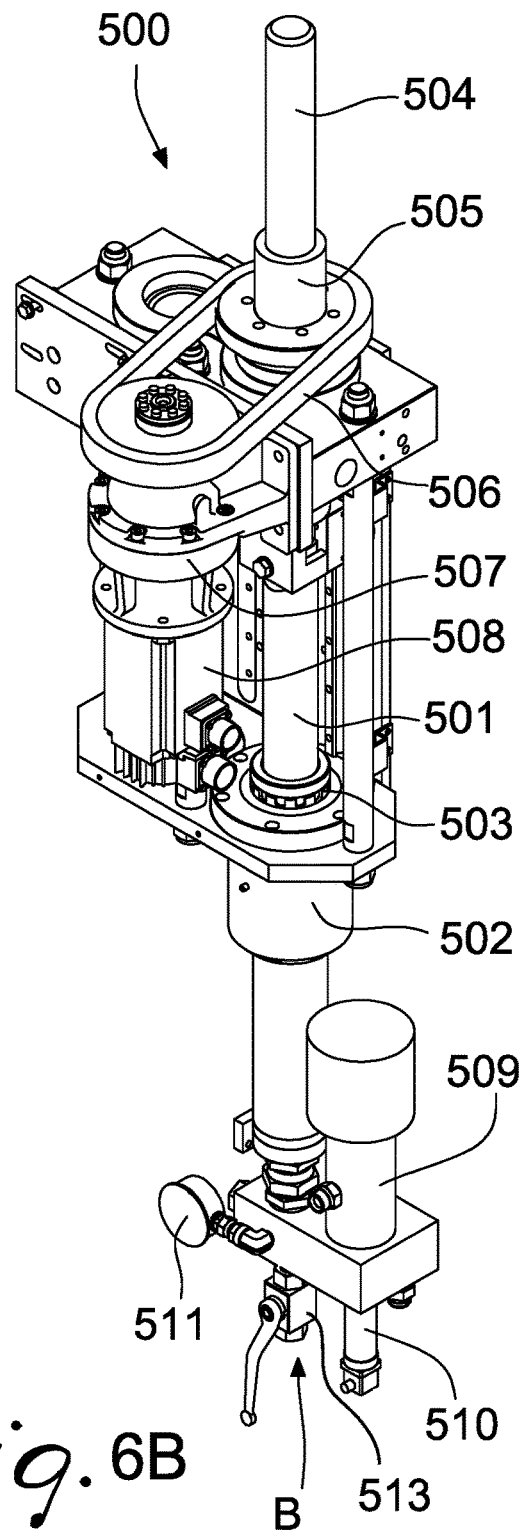
Fig. 6A
Fig. 6B

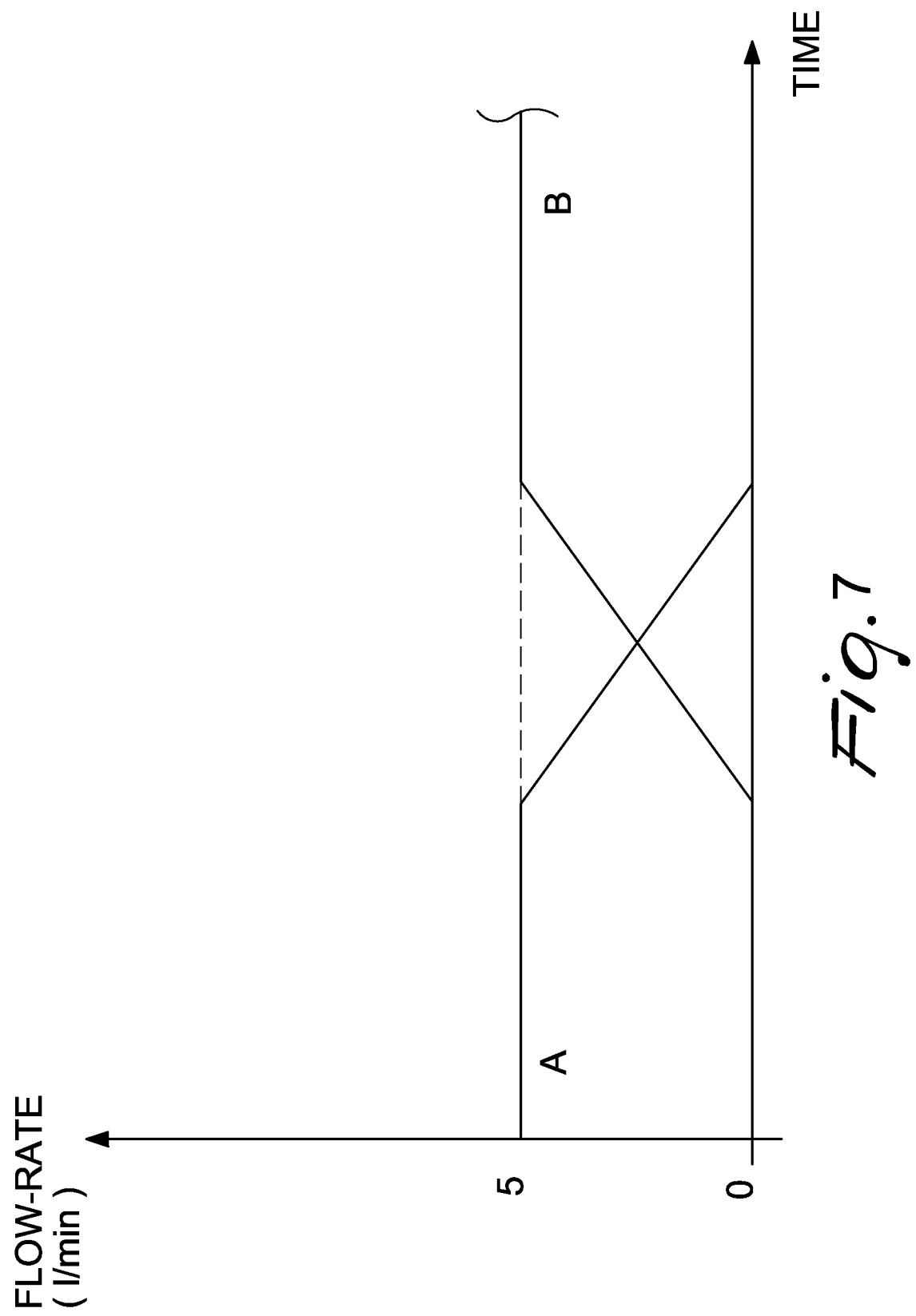

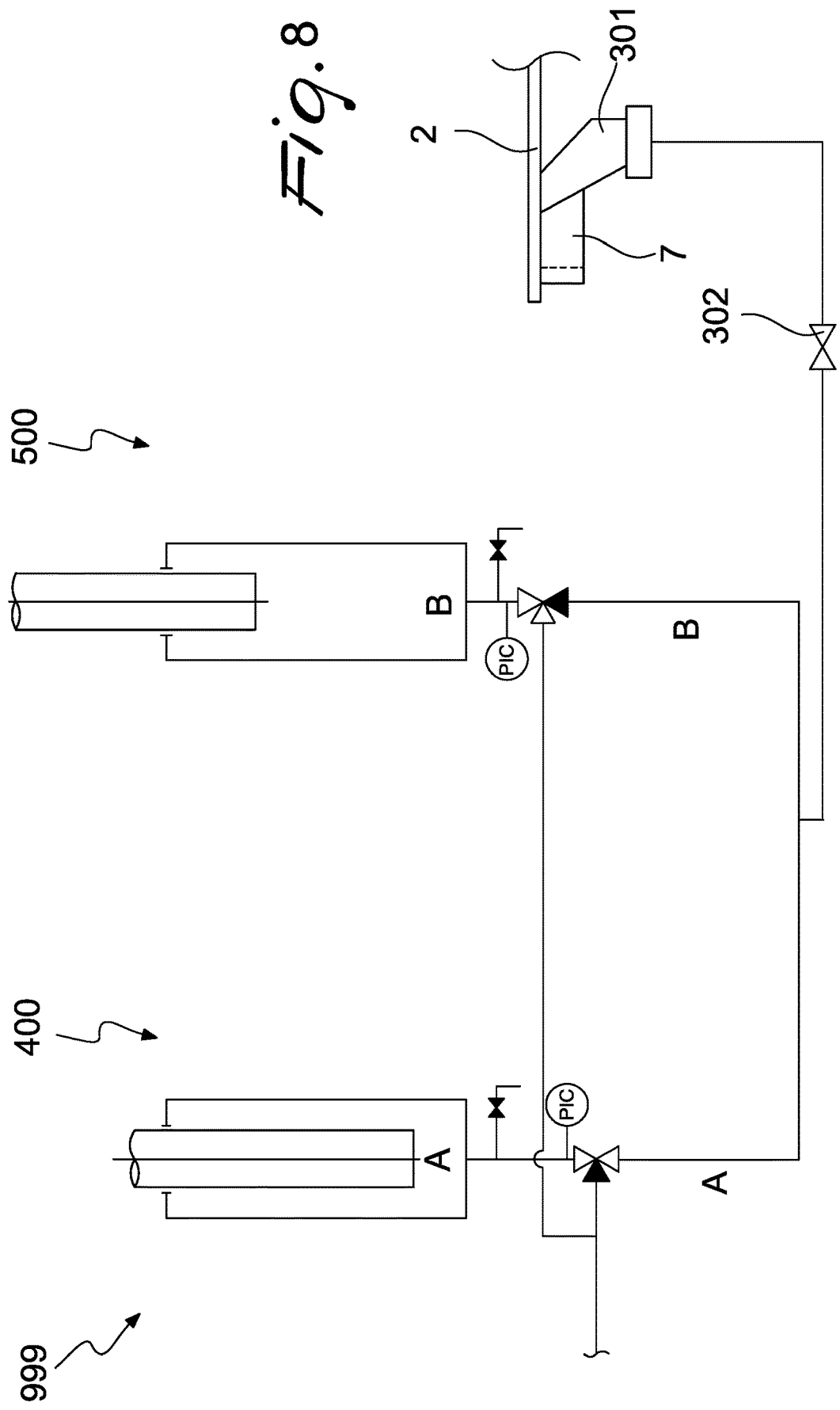

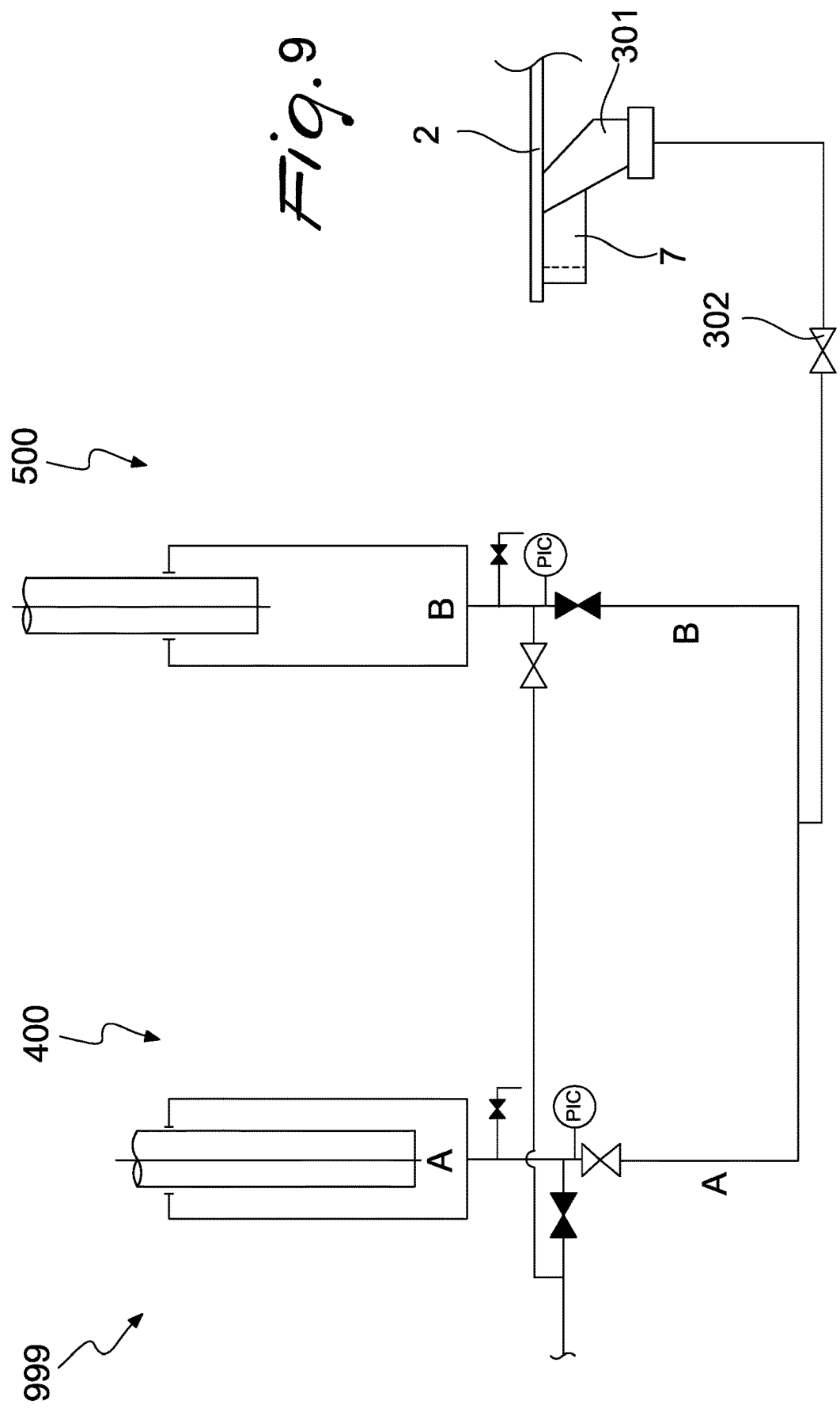

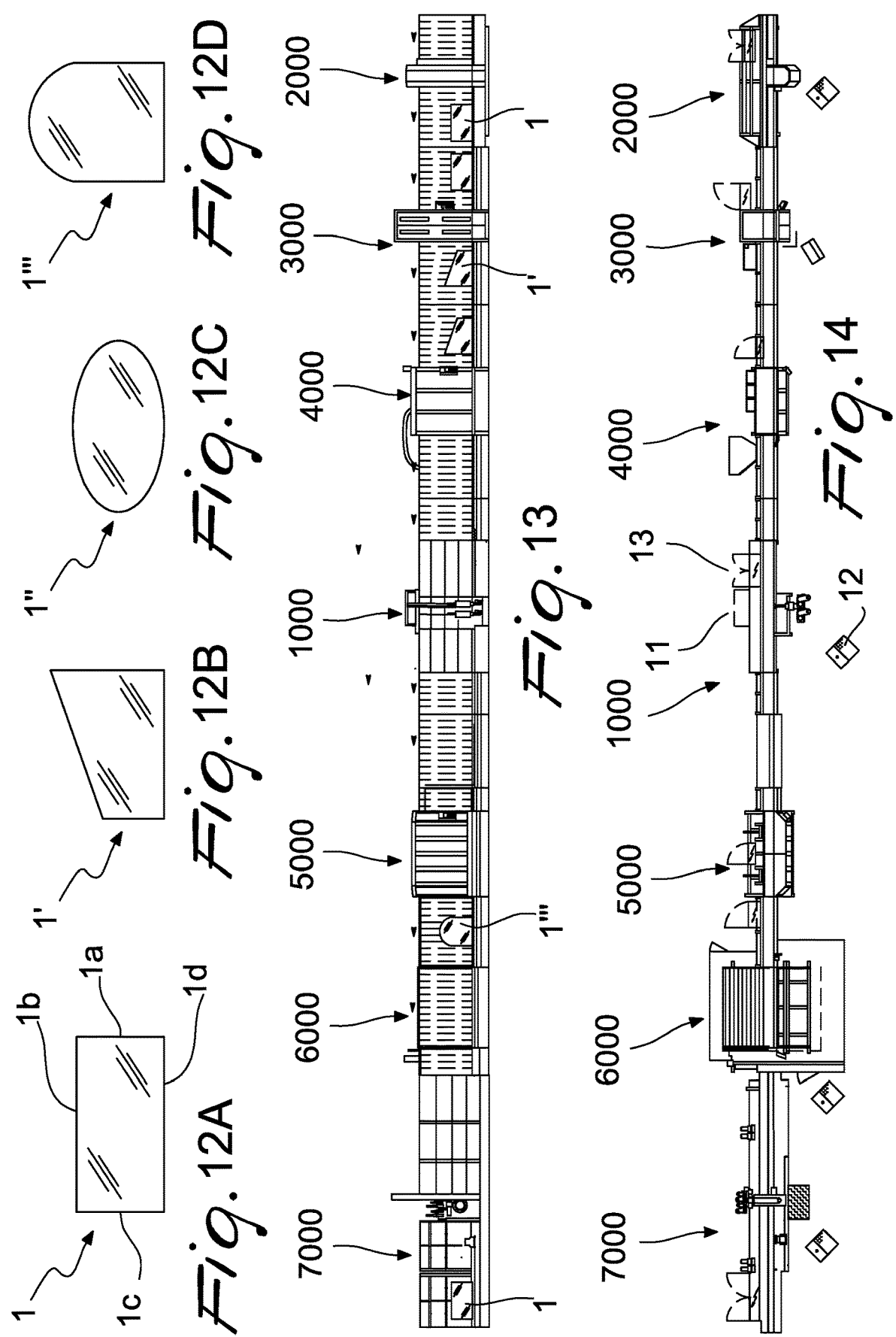

DOSAGE DEVICE FOR CONTINUOUSLY EXTRUDING AND APPLYING A SPACER PROFILE OF AN INSULATING GLAZING UNIT

CROSS REFERENCE TO RELATED APPLICATIONS

This application is related to and claims the benefit of Italian Patent Application No. 102016000082082, filed on Aug. 4, 2016, the contents of which are herein incorporated by reference in their entirety.

TECHNICAL FIELD

The present invention relates to a dosage device for continuously extruding and applying a spacer profile of an insulating glazing unit, particularly for a machine that is adapted to compose the spacer frame directly against one or more of the glass sheets that constitute the insulating glazing unit starting from a thermoplastic product contained in drums.

BACKGROUND

Currently it is known to deposit the rigid spacer frame (3) or the flexible spacer profile (5) pre-spread with sealant (6) and/or adhesive (6') on a glass sheet (2) so that the assembly is then mated with a second glass sheet (2') and sealed onto the entire external peripheral region so as to constitute the so-called insulating glazing unit (1).

The operation can further be multiple so as to obtain the insulating glazing unit 1 constituted by three glass sheets (2, 2', 2") and two frames (3, 3') or spacer profiles (5), as well as "n" glass sheets (2, 2', 2", 2"', 2M, 2'm, 2"m) and "n–1" frames (3, 3') or spacer profiles (5).

The solution is known of extruding a thermoplastic product, which is more effective if it is of the reactive type, i.e., which converts partially into elastomeric by reaction with the humidity of the air, against the face of one or more of the two or more glass sheets, so as to constitute a profile and therefore a spacer frame for the subsequent composition of the insulating glazing unit.

Preferably, the cross-section of the profile is rectangular.

And it is for this last type of profile and therefore of spacer frame, particularly when the width of the spacer profile that constitutes the spacer frame has considerable dimensions in combination with a considerable extension of the external peripheral region, but not only for these situations, that the invention according to the present application is of essential importance.

Taking for granted that the subsequent use of the insulating glazing unit (1) in the door or window is known, in detail the insulating glazing unit (1) is constituted by the composition of two or more glass sheets (2, 2', 2", 2"', 2M, 2'm, 2"m), which are separated by one or more spacer frames (3, 3'), generally made of inorganic material, such as for example aluminum or stainless steel or mixed inorganic/organic material, the second organic material being generally for example polyvinyl chloride (PVC), generally hollow and microperforated on the face that is directed inward, the spacer frames (3, 3') containing hygroscopic material (4) in their hollow part and being provided with a butyl sealant (6) (constituting the so-called first seal) on the lateral faces and the chamber (or chambers), delimited by the glass sheets (2, 2', 2", 2"', 2M, 2'm, 2"m) and by the spacer frame or frames (3, 3'), being able to contain for example air or gas (8) or gas mixtures (8) which provide the insulating glazing unit (1) with particular properties, for example thermal insulation and/or sound proofing properties.

Similar compositions are obtained by resorting to a spacer frame in a flexible spacer profile (5) having an essentially rectangular cross-section, which optionally contains two receptacles on its two sides intended for the butyl sealant (6), made of synthetic organic material, such as for example silicone and EPDM rubbers (from the English Ethylene-Propylene Diene Monomer), which is expanded and is provided in its sides or part thereof with an adhesive (6') which is useful for mechanical bonding with the glass sheets, or by resorting to an extruded spacer profile (7, 7') which also has an essentially rectangular cross-section made of thermoplastic material, and the present invention relates to the latter; in such cases the hygroscopic material (4) is distributed in the mass of the spacer profile since it is already contained in the mixture that generates said profiles.

Joining between the glass sheets (2, 2', 2", 2"', 2M, 2'm, 2"m) and the spacer frame or frames (3, 3') or (5) or (7, 7') is obtained by means of two sealing levels; the first one (also known in the jargon as primary) (6) having the function of providing a hermetic seal and the initial bonding between the components and affecting the lateral surfaces of the frame and the portions of the adjacent glass sheets, already mentioned earlier [thermoplastic butyl sealant for the shapes of the spacer frames of types (3) and (5), or constituted by the spacer frame itself if of type (7) made of thermoplastic material as is the case of the present invention], the second one (also known in the jargon as secondary) (9), typically constituted by an elastomeric bicomponent sealant, such as polysulfide (PS) or polyurethane (PU) or silicone (SI), processed at room temperature but also constituted by monocomponent sealant of the type processed at room temperature or of the hot processed type, having the function of providing final cohesion among the components and mechanical strength of the joint between them and affecting the compartment constituted by the outer surface of the spacer frame (3, 5, 7) and by the internal faces of the glass sheets up to the edge thereof (see FIG. 1A to FIG. 1F).

In the case of a spacer profile (5) made of expanded synthetic material, the first sealing level is replaced (in this case losing the hermetic sealing function) or can be integrated (in this case preserving the hermetic sealing function) by an adhesive (6'), for example an acrylic adhesive, which is already spread on the lateral faces of said spacer profile and is covered by a removable protective film (see FIG. 1D, in which said film has already been removed).

The glass sheets (2, 2', 2", 2"', 2M, 2'm, 2"m) used in the composition of the insulating glazing unit (1) can have different shapes as a function of the use thereof; for example, the outer glass sheet (outer being understood with respect to the building) can be normal or reflective or selective (in order to limit the thermal input during summer months) or laminated/armored (for intrusion prevention/vandalism prevention/bulletproof functions) or laminated/tempered (for safety functions) or combined (for example reflective and laminated, in order to obtain a combination of properties), the inner glass sheet (inner being understood with respect to the building) can be normal or low-emissive (in order to limit heat loss during the winter months) or laminated and/or tempered (for security functions) or combined (for example low-emissive and laminated in order to obtain a combination of properties).

The simple summary given already makes it clear that a manufacturing line for obtaining the insulating glazing unit product (1) requires many processes in a cascade arrangement and in particular comprises the process related to the forming the spacer frame to which the present application relates.

The processes for the production of the insulating glazing unit (1), each requiring a corresponding and particular machine to be arranged in series with respect to the other complementary ones, are, by way of non-limiting example and at the same time not all necessary, the following:

EDGING on the peripheral face of the glass sheet in order to remove any coatings and maintain over time the bonding of the primary sealant (6) and the secondary sealant (9);

BEVELING of the sharp edges of the glass sheet, both to eliminate the marginal effects introduced with the cutting operation, which potentially could trigger cracks, and to reduce the risks of injury in subsequent handling of the glass sheets (2, 2', 2", 2''', 2M, 2'm, 2"m) and of the finished insulating glazing unit (1);

WASHING of the individual glass sheets, with alternation between the inner glass sheet, any intermediate glass sheets, and the outer glass sheet (the orientation being the one defined earlier);

APPLICATION OF THE SPACER PROFILE: the spacer profile (3, 3') manufactured previously, filled with hygroscopic material covered (4) and covered on its lateral faces with a thermoplastic (butyl) sealant (6), having functions of providing a seal agent against the entry of humidity and the leakage of the gas (8), in machines which are external with respect to the line for the production of the insulating glazing unit (1), is applied to one of the glass sheets (2, 2', 2", 2''', 2M, 2'm, 2"m) that constitute the insulating glazing unit (1) in an adapted station of the line for producing the insulating glazing unit (1); as an alternative, a continuous strip of spacer profile (5) is unwound from a spool and is applied to one of the glass sheets until it also forms a closed frame, which is manufactured directly in adhesion against one of the glass sheets (2, 2', 2", 2''', 2M, 2'm, 2"m) after removal of the protective film, on the same line for the production of the insulating glazing unit (1); also as an alternative, and this is the case of the present invention, the spacer profile (7, 7') is extruded directly and shaped with an adequate cross-section against the face of one of the glass sheets (2, 2', 2", 2''', 2M, 2'm, 2"m) until it also forms a spacer frame;

COUPLING AND PRESSING of the assembly constituted by the glass sheets and the frame or frames (i);

FILLING WITH GAS of the chamber or chambers thus obtained, for example performed in the same machine that performs the functions of the preceding paragraph, or in a subsequent machine, as shown in the figures, which show the complete configuration of the line for producing the insulating glazing unit (1);

SECOND SEALING of the assembly of the components: glass sheets (2, 2', 2", 2''', 2M, 2'm, 2"m), spacer frame (3, 3', 5, 7, 7'), at the perimeter.

The processes listed above can be performed by the respective machine automatically or semiautomatically or, for some operations, with a manual method.

Machines and methods are known for the extrusion of a spacer profile made of thermoplastic material directly against one or more of the glass sheets (2, 2', 2", 2''', 2M, 2'm, 2"m), which is limited because this technology has not developed due to the problems described later, which however become solvable by virtue of the innovative principle introduced with the present invention.

This background art leads to the following prior art: U.S. Pat. No. 5,961,759, EP0823318B1 and EP0823531B1, which introduce the variant in the transients of the beginning and end of extrusion.

US2012/0180936A1 is also known which introduces the simultaneous and parallel extrusion of two different types of product so that a strip has vapor/gas barrier characteristics and contains the desiccant diffused in its mass and the other one has characteristics of mechanical stability of the joint.

A second sealing operation, as described in the work cycle of the insulating glazing unit (1), can be omitted, with the advantage of eliminating a very expensive machine albeit increasing the complexity of the forming of the spacer frame.

This last title must be considered as reference, since it describes the complete circuit for the transfer and dosage of the products from the storage drum to the extrusion nozzle.

Finally, WO2015/113080A1 is known.

This background art deriving from the developments of machines based on the teachings of the main patent titles cited above have the drawbacks described below.

With reference to FIG. 1 of US2012/0180936A1 for the numbering of the components: for each individual product one resorts to a gear pump (11, 11') for transfer from the storage drums and to a dosage gear pump (15, 16) but an intermediate storage (13, 14) is required in order to accumulate product directly upstream of the dosage pump (15, 16), and this entails the inconvenience of making the process discontinuous and the consequent discontinuity of extrusion during the step of reloading the buffer.

The dosage gear pump (15,16) operates synchronously to extrude a product flow-rate adapted to obtain a profiled cross-section (generally rectangular) of dimensions (width "w" by thickness "h") at the process speed "v" equal to the relative one between the extrusion nozzle and the glass sheet.

Gear pumps, however, when used to pump viscous and unfortunately non-Newtonian and abrasive products which are sometimes corrosive, such as thermoplastic products in the manufacture of the spacer frame of the insulating glazing unit and when they are intended for high flow-rates, must be manufactured with very particular solutions which often do not provide a solution regarding the choice of materials and of machining tolerances, and this makes them very expensive.

Furthermore, due to abrasion and corrosion, they have a rather short life and a progressive decay of precision during operation, since as plays increase and erosion channels form, bypass paths are created between the chamber that lies downstream of the gears and the chamber that lies upstream, thus recycling part of the product instead of dosing it.

According to the teachings of WO2015/113080A1 as regards the joining of the leading end and of the trailing end of the extruded profile to compose a closed frame, but according to the background art as regards pumping and dosage, it is composed as follows, drawing a parallel with the description of the preceding solution: a screw pump transfers the product (single) from the storage drum to the dosage cylinder, the piston of which is actuated synchronously to extrude a product flow-rate that is adapted to obtain a profiled (generally rectangular) cross-section of dimensions (width "w" by thickness "h") at the process speed equal to the relative speed between the extrusion nozzle and the glass sheet.

Although the screw pump and the dosage cylinder do not entail the problems of gear pumps, the dosage cylinder, having a large volume, is however lacking in dosage precision.

Most of all, the discontinuities of both of these known processes cannot be overcome by increasing respectively the volume of the intermediate accumulation storage or of the dosage cylinder, since the compressibility of the product, despite being slight, entails in the first case difficulty in controlling the supply conditions of the dosage gear pump and in the second case a nonlinearity of the flow-rate with respect to the electric tie for the control of the piston of the dosage cylinder.

For these reasons, the intermediate accumulation storage tank and the dosage cylinder must be limited in volume, and therefore their capacity is insufficient to extrude the spacer profile without discontinuities, and this increases as the extension of the perimeter of the spacer frame and its cross-section "S" (S=w×h) increase.

The aim of the present application is to eliminate the drawbacks of the background art, providing a device that allows continuity in the process of extrusion and deposition of the spacer profile.

SUMMARY

Within this aim, an object of the present invention is to allow to achieve high flow-rates of the thermoplastic product and also a lack of discontinuity of extrusion even in the situation of large dimensions ("w" and "h") of the spacer profile and of considerable extension of the perimeter of the spacer frame.

Another object is to provide a device that allows to achieve dosage precision and to maintain dosage precision over time, eliminating the problems of the background art.

Another object, which is not less important but is complementary to the described aim, is to reduce load losses of the thermoplastic product in its path from the dosage device to the extrusion nozzle by placing the dosage device on board the movable carriage that bears the extrusion head.

DESCRIPTION OF THE FIGURES

FIGS. 1A, 1B and 1C show the rigid frame (3) made of metal profile (typically aluminum or stainless steel or a combination of stainless steel and plastic), which is hollow and is filled with hygroscopic material (4), while FIG. 1D shows the frame of the flexible type (5), which embeds the hygroscopic material (4) in its mass.

Figure 1:
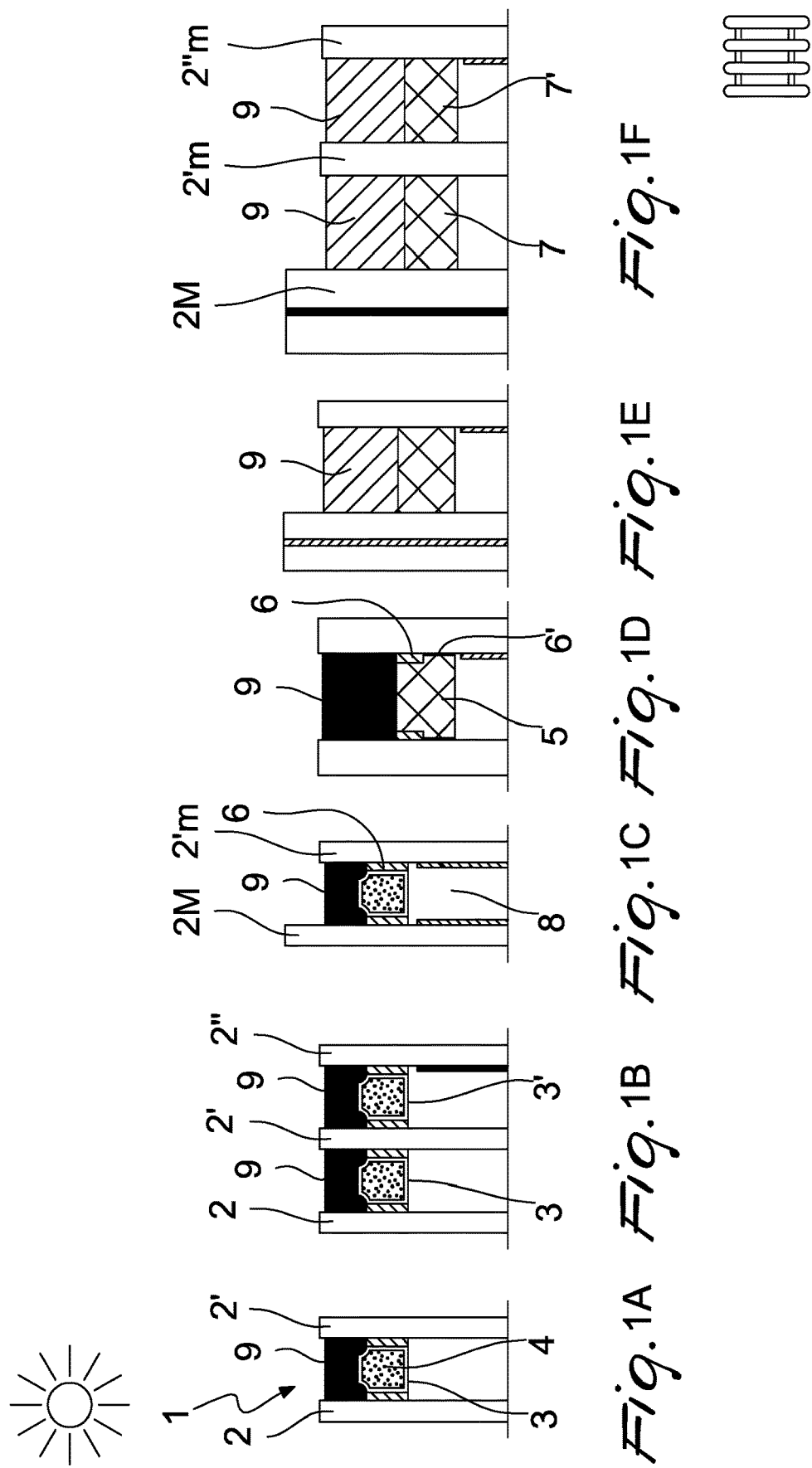
FIGS. 1A to 1F are schematic views of the peripheral portion of the insulating glazing unit 1 in a non-exhaustive exemplifying series of possible combinations: 1A normal; 1B triple glazing with inner sheet with low-emissivity coating; 1C outer sheet with selective coating and offset with respect to the inner sheet with low-emissivity coating; 1D tempered outer sheet and inner sheet with low-emissivity coating; 1E laminated outer sheet offset with respect to the inner sheet with low-emissivity coating; 1F triple glazing with laminated outer sheet offset with respect to the remaining two glass sheets, the inner one having a low-emissivity coating.

The two types of sealant used are shown in cross-section: in denser shading, the butyl sealant (6), which has the function of an initial bonding between the components and of a hermetic seal (first sealing and primary sealant), in the case of a flexible frame, instead, one uses an acrylic adhesive (6') (which is only indicated but not shown, since it has a thickness of a few μm—micrometers-) or the combination of the acrylic sealant (6') and of the butyl sealant (6) applied between the receptacles of the lateral surfaces of the frame and the glass sheets, as can be seen in FIG. 1D; in broader shading, the polysulfide (PS) or polyurethane (PU) or silicone (SI) sealant (9), which has the function of mechanical coupling to the edge and of hermetic seal (second sealing and secondary sealant) applied between the outer surface of the frame and the faces of the glass sheets up to the edge of the glass sheets or of the glass sheet (2'm) having the smallest dimensions (in the case of offset glass sheets).

The secondary sealant also contributes, albeit less than the primary sealant, to the hermetic seal against the entry of humidity and the escape of the gas (8).

FIGS. 1E and 1F show the cases in which the spacer frame (7) is constituted by the extruded thermoplastic product, to the forming of which the present invention contributes in an innovative way especially in cases of large cross-section of the spacer profile (w×h) and large extension of the perimeter of said frame.

The inner/outer orientation is identified visually with icons that represent the sun (outer side) and the radiator (inner side).

One deduces from these figures that the insulating glazing unit (1) can have multiple shapes, particularly in the evolution of the type of spacer frame, which ranges, with reference to large families, from a prefabricated frame provided by means of a rigid profile (3) and fitted against one or more glass sheets to a frame provided by means of a flexible profile (5) unwound from a spool directly against one or more glass sheets to the frame made of thermoplastic product (7) extruded directly against one or more glass sheets.

Figure 2:
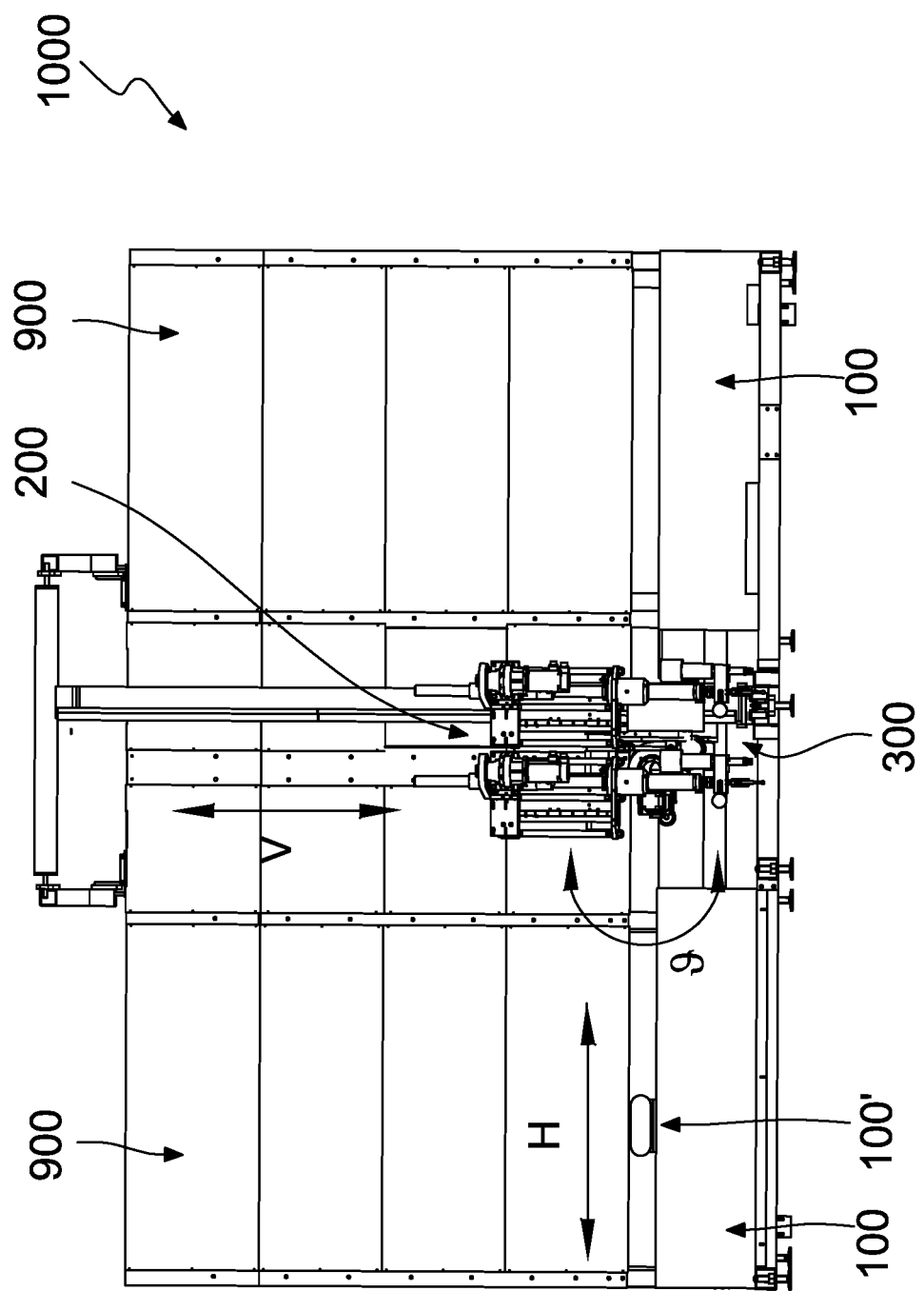
Figure 3:
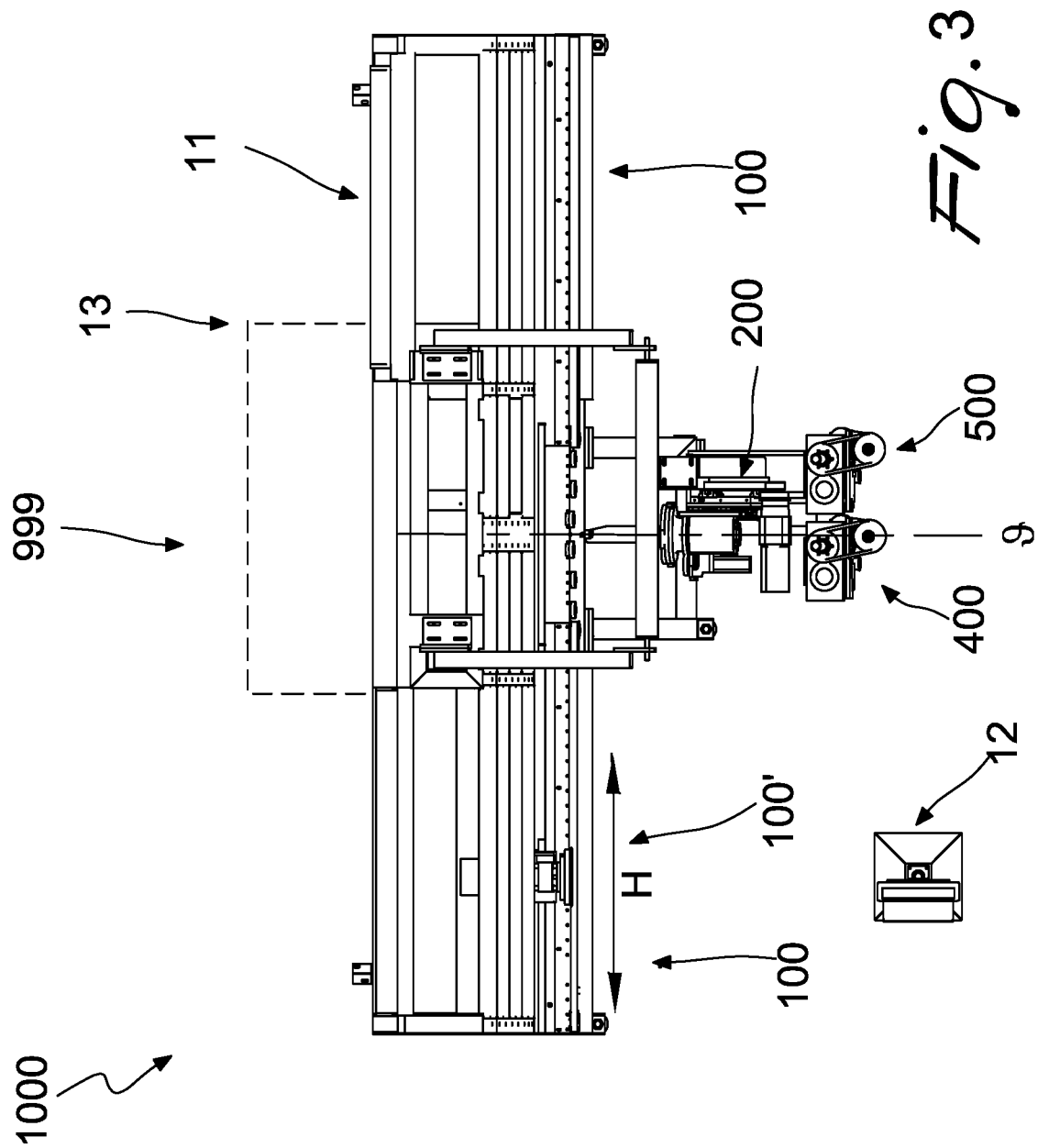
Figure 4:
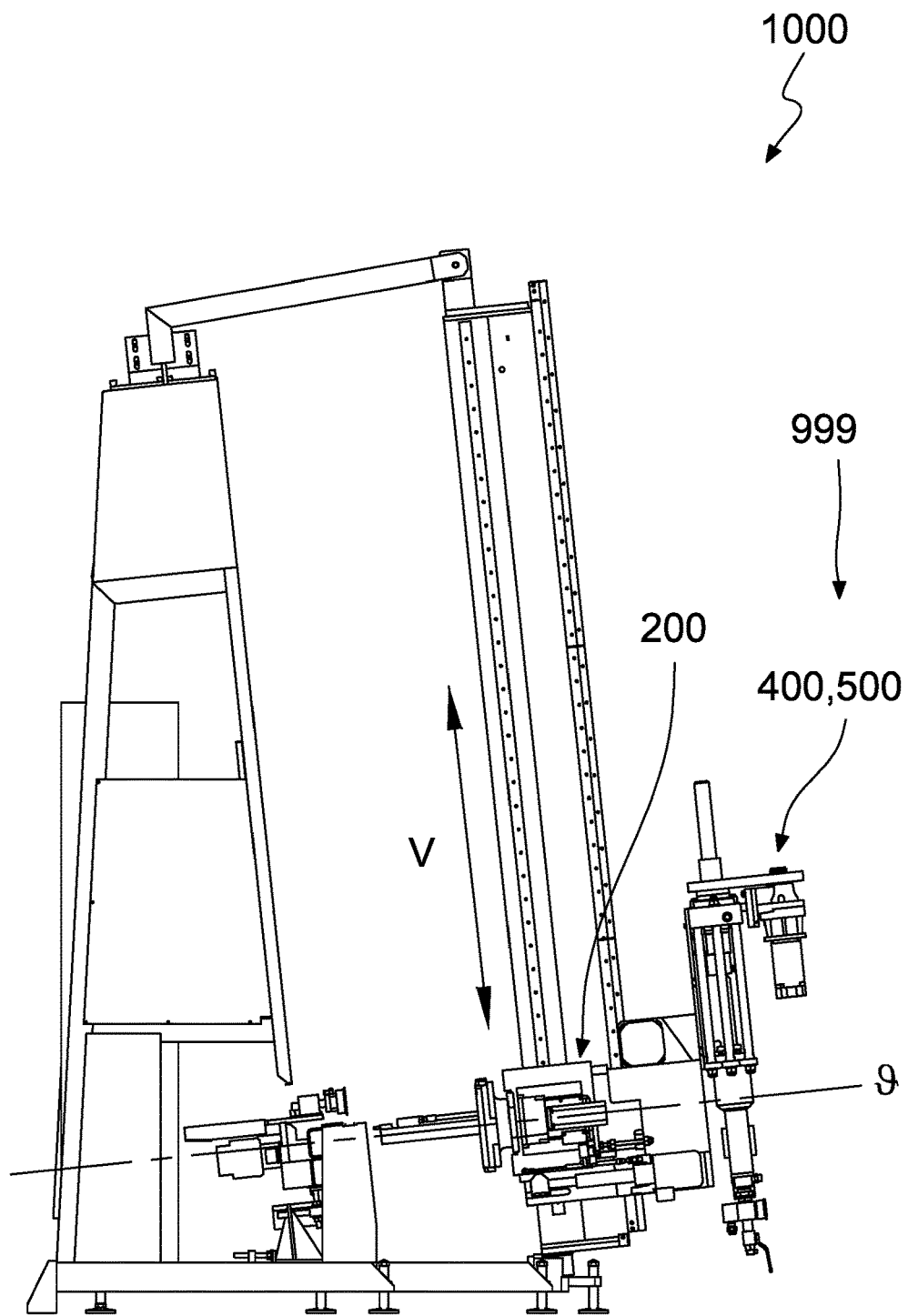

FIGS. 2, 3, 4 show the automatic machine (1000) for forming the spacer frame obtained by extrusion of the spacer profile by means of the dosage device (999) according to the present invention, respectively in its overall main views: front, from above, from the side, with identification of the horizontal axis H [provided by the means assembly (100) of the known type constituted both by the motorized pseudo-horizontal conveyors that act on the lower edge d of the glass sheet (2, 2', 2", 2''', 2M, 2'm, 2''m) and by the carriage with sucker (suckers) (100'), which acts on the face of the glass sheet (2, 2', 2", 2''', 2M, 2'm, 2''m), while said glass sheet remains rested on said motorized pseudo-horizontal conveyors, which are slightly inclined with respect to the horizontal plane, and on a pseudo-vertical sliding surface (900), which is slightly inclined with respect to the vertical plane, provided with free wheels or with an air cushion], of the vertical axis V [assembly (200) of the known type] and of the rotation axis θ (theta) [assembly (300) of the known type].

FIGS. 5A, 5B, 6A and 6B are opposite axonometric views (for the visibility of all the components) respectively of the first and second dosage assemblies (400, 500), which can be termed "relay", this term describing their mode of operation, i.e., swapping of the active dosage step between one of the first dosage assembly (400), with dosage device 'A', and the separate second dosage assembly (500), with dosage device 'B', without discontinuity of the output flow toward the nozzle and then from the nozzle toward the face of the glass sheet (2, 2', 2", 2''', 2M, 2'm, 2''m) that, composed by means of one or more twin elements, will constitute the insulating glazing unit (1).

The first and second dosage assemblies (400, 500) constitute the dosage device (999), to which the present application relates.

FIG. 7 is the flow-rate chart of each one of the "relay" dosage assemblies in combination with the complementary chart of the other dosage assembly. The ordinates plot the flow-rate 'A' of the base product of the first dosage assembly (400) and the flow-rate 'B' of the base product of the second dosage assembly (500). These charts demonstrate mathematically, as well as intuitively, that in the transition band [swapping between the dosage device of the first dosage assembly (400) and of the separate second dosage assembly (500)] the flow-rate at the extrusion nozzle is unchanged (dashed line). The abscissas plot time.

FIG. 8 is the single-line diagram of the circuits of the fluids (A, B) (base product) in the interconnection with the first dosage assembly (400) in the active step and the second dosage assembly (500) in the reloading step, in the solution using three-way valves for the main circuits.

FIG. 9 is the alternative single-line diagram of the circuits of the fluids (A, B) (base product) in the interconnection with the first dosage assembly (400) in the active step and the second dosage assembly (500) in the reloading step, in the solution using two-way valves, a condition which is more practical and reliable from the systems standpoint.

Figure 10:
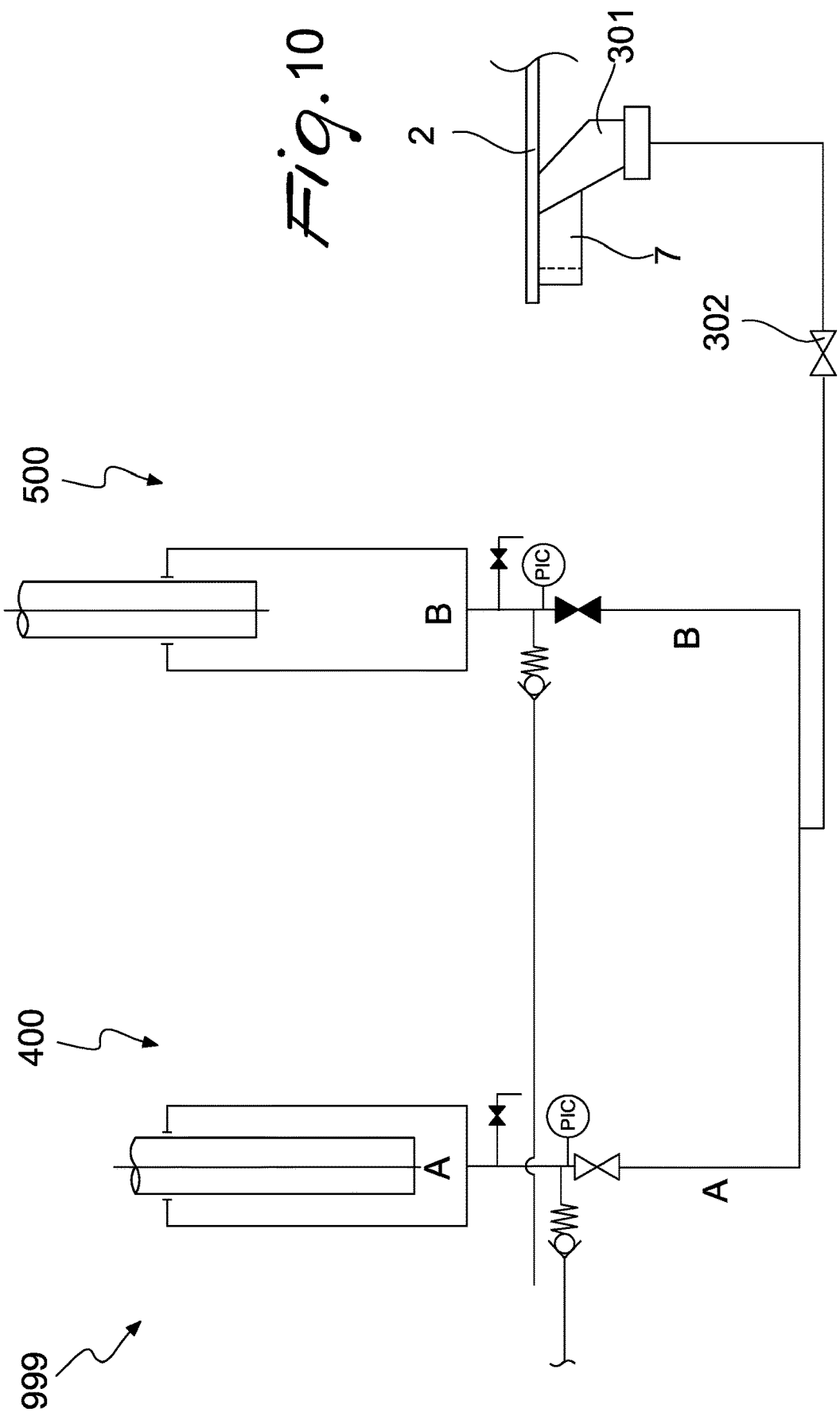

FIG. 10 is an alternative single-line of the circuits of the fluids (A, B) (base product) in the interconnection with the first dosage assembly (400) in the active step and the second dosage assembly (500) in the reloading step, in the solution using two-way valves and one-way valves, a condition which is more practical and reliable from the systems standpoint.

Figure 11:
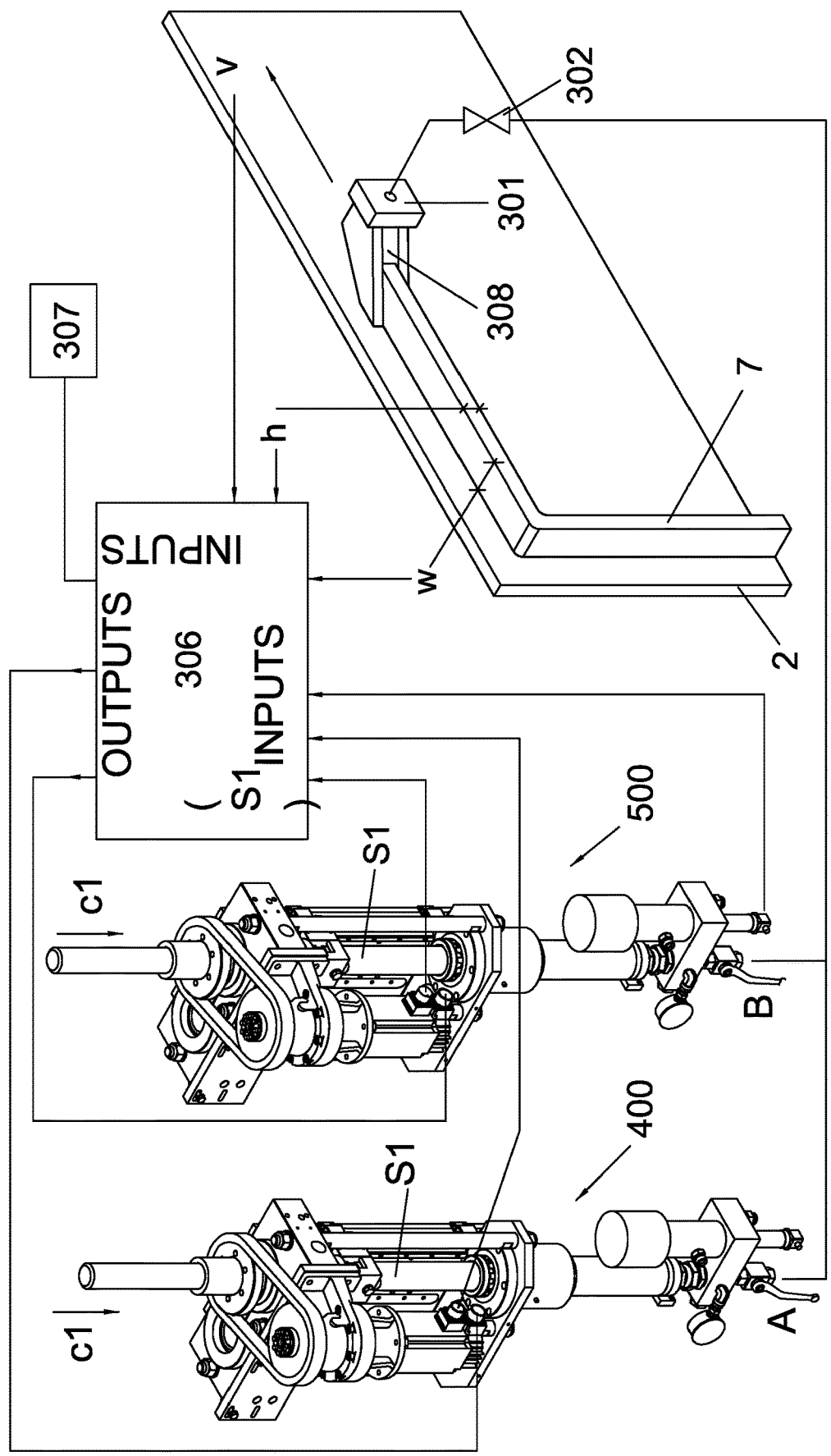

FIG. 11 is a view of the circuits and of the logic and power controllers.

FIGS. 12A, 12B, 12C and 12D are views respectively of the insulating glazing unit 1 in the following shapes: rectangular (1), polygonal (1'), curvilinear (1"), mixed (1'"). In the case of the rectangular shape (1), the sides are designated in lowercase letters in one of the possible sequences of application of the spacer profile to form the spacer frame (7) according to the following progression: side (a), corner (a/b), side (b), corner (b/c), side (c), corner (c/d), side (d), corner (d/a).

FIG. 13 is a view of an example of insertion of the automatic machine (1000) for forming the spacer frame obtained by extrusion of the spacer profile (7) by means of the dosage device (999), in the line for the production of the insulating glazing unit (1) (overall view) and does not comprise: electrical/electronic panel, control post and protection devices.

FIG. 14 is a view of an example of insertion of the automatic machine (1000) for forming the spacer frame obtained by extrusion of the spacer profile by means of the dosage device (999) in the line for the production of the insulating glazing unit (1) (plan view) and includes: electrical/electronic panel (11), control post (12) and protection devices, which are designated generally by (13), be they of the type of mechanical screens, or optical barriers, or laser barriers, or electrically sensitive mats, or region scanners, etc., since particular attention is given not only to the functional, qualitative and productive aspects that are part of the content of the present invention but also to the aspects related to injury prevention.

The following products: insulating glazing unit (1), glass sheet (2, 2', 2", 2'", 2M, 2'm, 2"m), spacer frame (3, 3', 5, 7, 7') and further components thereof are designated by single-digit numbering.

In particular, in order to distinguish the various possible shapes of the insulating glazing unit (1), as already mentioned, (1) designates the most frequent situation (rectangular), (1') designates the polygonal shape, (1") designates the curvilinear shape, and (1') designates the mixed shape.

The components that are interfaced with the automatic sealing unit are designated by two-digit numbering.

The main components of the inventive device according to the present application (400, 500) and of the known correlated devices are designated by three-digit numbering, wherein the ones containing two zeros are referred to sets or assemblies while the others are referred to the respective details.

The machines that belong to the line for the production of the insulating glazing unit (1) are designated by four-digit numbering, in the order according to the description, reserving (1000) for the automatic machine for forming the spacer frame obtained by extrusion of the spacer profile (7) by means of the dosage device (999).

DETAILED DESCRIPTION OF THE DRAWINGS

In the exemplary embodiments that follow, individual characteristics, given in relation to specific examples, may actually be interchanged with other different characteristics that exist in other exemplary embodiments.

To describe a way of embodying the invention, which comprises all the equivalents, reference is made to FIGS. 5 to 11 for the general concepts and for the details adapted to make one or more of the possible embodiments of the invention fully understandable to the person skilled in the art.

What is shown partially or not shown in FIGS. 2, 3, 4 regarding the machine provided with synchronous axes H, V and θ (theta) is instead assumed to be known and therefore not requiring a detailed description, since both the prior art described earlier and the knowledge of the person skilled in the art do not require any clarification for the construction of these parts related to the machine for applying the spacer frame against the face of the glass sheet, a machine which is essentially constituted by the following assemblies: (100) for motion along the synchronous horizontal axis H of the glass sheet (1) by means of its lower edge (1d); 100' for motion along the synchronous horizontal axis H of the glass sheet by means of a sucker carriage which interacts with the front face of said sheet; (200) for the motion of the extrusion head along the synchronous vertical axis V; (300) for the extrusion head that rotates along the polar axis θ (theta); (900) for the pseudo-vertical conveyors for supporting the glass sheet (1).

Each first and second dosage assembly (400, 500) is constituted by the dosage device of said product [product which is correlated to the symbol 'A' when used in the first dosage assembly (400) and to the symbol 'B' when used in the second dosage assembly (500)], and is of the syringe type.

Obviously, in the case of a bicomponent product (base and catalyst), if the market makes it available, although this situation is not current, each dosage assembly is provided with two syringes, one for the base product, one for the catalyst product; this situation is described for the parallel vase of the automatic sealing unit according to the patent application filed on the same date by the same Applicant.

FIGS. 2-6 and 11 commented earlier already contain the illustration of the structural provision for the insertion of the catalyst syringes in both dosage assemblies (400, 500).

Each one of the first and second dosage assemblies (400, 500) [reference is made to the first dosage assembly (400), for the twin assembly (500) the description is identical, changing the first digit from "4" to "5"] is constituted by: (401) plunger or syringe; (402) cylinder or chamber; (403) hermetic seal; (404) ballscrew; (405) ballscrew sleeve; (406) mechanical transmission, for example of the type with sprockets and chain; (407) mechanical reduction unit; (408) synchronous electric motor.

It goes without saying that these components are coupled partly to an upper plate and partly to a lower plate connected by tension members, structural elements as visible in FIGS. 5A, 5B, [6A, 6B for the twin dosage assembly (500)] which in turn are fixed to a plate for connection to the vertical carriage (200) which moves along the axis V so that the distance between the dosage device and the extrusion head is limited in order to contain load losses, in view of the high flow-rates required in extrusion.

The dosage device comprises further the following auxiliary components, which are however in any case indispensable [reference is made again to the first dosage assembly (400), for the twin assembly (500) the description is identical, changing the first digit from "4" to "5"]: (409) three-way valve, which can be replaced by two two-way valves or by a two-way valve and a one-way valve; (410) pressure transducer; (411) pressure gauge; (412) overpressure valve or rupture disk; (413) manual withdrawal or venting valve.

As already mentioned, the description related to the second dosage assembly (500) is superfluous, since it is possible to use the preceding description simply by replacing the first digit of the assembly "4" with "5" and the letter 'A' with the letter 'B'.

All these components belong individually to the background art that occurs in machines for the perimetric sealing of the insulating glazing unit, which however uses a single dosage and pumping system [for example the one of the assembly (400) or the identical one of the assembly (500)] or uses two systems that coexist but only because each one is intended for a separate sealant and only for the need to work alternately in the same sealing machine with more than one type of sealant (typically PS and SI or PS and PU).

A particular characteristic of the present invention resides in using the communion of two dosage assemblies: the first dosage assembly (400) is composed of the numberings whose first digit of three is "4", while the second dosage assembly (500) is composed of the numberings whose first digit of three is "5"; both operate with the same product, which is generally thermoplastic, such communion being controlled by a swapping logic such as to maintain an active condition at the dosage nozzle (301) that is free from discontinuities, both in terms of flow-rate and in terms of pressure.

This is shown evidently in FIGS. 7 to 10 commented hereafter.

The swapping logic is obtained by acting in a complementary manner on the flow-rates of the first dosage assembly (400) and of the second dosage assembly (500) and in a controlled manner on the process pressures.

A possible single-line diagram of operation of the dosage assemblies is shown in FIG. 8, which shows the condition of the first dosage assembly, designated by the reference numeral (400), which dispenses the base product (A) toward the nozzle (301) which interacts with the peripheral region of the glass sheet and of the second dosage assembly (500), which dispenses the base product (B) in the reloading step; the shaded part of the symbols that represent the valves indicates the side in the closed state; the corresponding position in the chart or diagram of FIG. 7 being the one of the left part with "A" at the nominal flow-rate and with "B" at nil flow-rate.

It is straightforward to deduce the condition of the second dosage assembly (500) in the step of dispensing toward the nozzle (301) which interacts with the peripheral region of the glass sheet and of the first dosage assembly (400) in the reloading step, simply by reversing the state of the valves, with corresponding position in the diagram or chart of FIG. 7 of the right part with "A" at nil flow-rate and "B" at the nominal flow-rate.

In FIG. 8, the interrupted part on the left is assumed to be known, constituting respectively the feeding of the product as arriving from the pump, typically of the double-acting type arranged on the pressing plate of the product storage drums for the transfer of feeding to the dosage devices, as already disclosed in the cited prior art.

Explanation is now given of the joint, complementary and simultaneous mode of dispensing of the first and second dosage assemblies (400, 500), i.e., the one related to the central position of the diagram or chart of FIG. 7, in which both the flow (A) and the flow (B) are active, this being a solution that is quite distant and highly innovative with respect to the situation of the closest background art of US2012/0180936A1 FIG. 1, described earlier, which does not solve the problem of discontinuity during transients for reloading the storage devices (13, 14), with consequent lack of aesthetic uniformity of the spacer profile extruded against the glass sheet.

In general and with reference to the most widespread glass sheet configuration, i.e., the rectangular one (1), the progression of the extrusion of the spacer profile along the sides is typically the following: first vertical side (1a), second horizontal upper side (1b), third vertical side (1c), fourth horizontal lower side (1d). The unavoidable transients of the flow of product at the corners where the nozzle (301) must rotate through 90° are already managed in the background art by reducing the relative speed between the nozzle (301) and the peripheral region of the glass sheet (1) and the corresponding reduction of the flow-rate of sealant until said relative speed is canceled and the flow-rate is canceled in the extrusion start and end position.

The illustrated background art does not have a solution for the interruption of the flow of the product that derives either from the depletion of the load of the intermediate storage or from the depletion of the load of the dosage device and is forced to perform sudden transients, which have repercussions on the geometric and functional irregularity of the spacer profile, a transient that increases in frequency as the cross-section of the spacer profile increases, as the length of the perimeter of the glass sheet increases and as the volume of the intermediate storage or of the dosage device decreases.

Moreover, the volume of the dosage device cannot exceed the typical value comprised between (0.7÷0.8) liters, since the compressibility of the product, although slight, entails an instability of the process in terms of nonlinearity of the equation [v×S=c1×S1]; where "v" is the nozzle (301)—glass sheet relative speed, "S" is the area of the cross-section of the spacer profile (which the process logic calculates as a product of the width of the spacer profile "w" by the thickness "h" thereof), "c1" is the speed of the base syringe and "S1" is the area of its cross-section.

This nonlinearity, which entails control difficulty, arises from the fact that upon the movement of the syringe, in a pressure variation condition, dispensing at the nozzle (301) is altered by the quantity removed or added for the volume variation of the product (A, B) caused by its compressibility.

However, the present invention solves even this, by means of a solution described hereinafter.

With the mode of use of the first and second dosage assemblies and of their joint, complementary and simultaneous operation, as shown in FIG. 7, the dispensing of the product undergoes no discontinuities in flow-rate.

An important refinement is to equalize the pressure of the second dosage assembly [(500) in the description discussed so far, which is taking over], which begins its extrusion ramp, toward the pressure of the first dosage assembly [(400 in the description discussed so far, which is quitting], which begins its depletion ramp; this is performed by acting on the motor (508) provided with feedback by means of the transducer (510), prior to the actuation of the valve (509).

Said transducer is arranged directly upstream of the valve (509), in the various versions of solutions for this valve, so that the pressure controls are not affected by the load losses of the circuits upstream thereof.

This is evident in FIGS. 8 to 10 by means of the symbol PIC (Controlled Indicated Pressure).

An additional refinement, which in any case is already background art, is to install the dosage assemblies on the carriage (200), as shown in FIGS. 2 and 4 so that the path of the product (A alternated with B) as shown in FIGS. 8 to 10 is the shortest possible, although the path itself sometimes comprises, in the case of a bicomponent product, a static mixer which entails a load loss caused by the energy required for mixing.

As regards the logic and power controls used to embody the flow-rate diagram of FIG. 7 of the product (A, B), everything is summarized in FIG. 11, which indicates the main INPUTS and OUTPUTS at the controller (306) and specifically:

INPUTS:
w=width of the spacer profile
h=thickness of the spacer profile
v=relative speed between peripheral region of glass sheet and extrusion nozzle (301)
signals from the pressure transducers
feedbacks from the synchronous motors OUTPUTS:
actuations toward the synchronous motors, such as to embody the equation [v×S=c1×S1], even in the steps of the ramps according to the central region of the diagram of FIG. 7.

Other parameters reside in the controllers, such as for example the cross-sections "S1" of the syringes, since they are fixed data.

During these ramps, the first dosage assembly (400) reduces the speed c1 of the syringe (401) from the nominal value, which corresponds to the flow-rate [v×S], until it is canceled, while the second dosage assembly (500) moves the syringe (501) from the inactive condition, i.e., with "c1" equal to zero, up to the nominal value, which corresponds to the flow-rate [v×S].

The functions that control the ramps are such that the sum of the respective flow-rates (A+B) always corresponds to the nominal flow-rate [v×S], and these functions can be linear or nonlinear.

This description refers to the case, which is the only one in the background art, in which the product to be extruded is monocomponent.

The possibility that bicomponent products might appear in the future is described in the parallel patent application, filed on the same day by the same Applicant, which relates to "relay dosage devices" for the perimetric sealing of the insulating glazing unit, in which the sealants are predominantly bicomponent (base and catalyst).

The process controller (306) shown in FIG. 11 communicate with the operator interface (307) located on board the control post 12.

Generally, the product used to manufacture the spacer frame is monocomponent and is extruded hot, being a thermoplastic product, so that the dosage devices themselves (400, 500) shown in FIGS. 5A, 5B, 6A, 6B and the circuits shown in FIGS. 8 to 10 and the extrusion nozzle (301) shown in FIGS. 8 to 11 are temperature-controlled, and so are the product storage drums with the corresponding presser plates and transfer pumps [typically the drums are two, since upon depletion of one the other one is already preheated and ready for switching toward the dosage assemblies (400, 500)].

However, other types of product, be it monocomponent or bicomponent, adapted to constitute the spacer profile, that the evolution of the art might make available in the future, again suitable to be used in the claimed "relay" dosage device (999), are not excluded.

The profile extruded against the glass sheet has a generally rectangular cross-section with an area "S", the sides "w" and "h" of which are formed by means of the shape of the outlet of the nozzle (301).

Generally, "h" is kept constant (or changes discontinuously by replacing the extrusion nozzle assembly (301) and "w" is changed as a function of the composition of the insulating glazing unit (1), with the possibility of continuous selection by means of the adjustment of the gate (308) of the nozzle (301), which is normally obtained by means of an actuator with position feedback.

The present invention is susceptible of numerous constructive variations (with respect to what can be deduced from the drawings, the details of which are evident and eloquent), all of which are within the scope the appended claims; thus, for example, the mechanical solutions for the movements of the dosage syringes, the actuation means, which can be electrical, electrical-electronic, pneumatic, oil pressure-operated and/or combined, etc, the control means, which can be electronic or fluidic and/or combined, etc.

One variation of the known part of the invention, which resides practically in the software and therefore uses the same devices described earlier for the rectangular glass sheets (1) described so far is the one constituted by the logic combination of the synchronous actuations respectively: of horizontal translation along the axis H of the insulating glazing unit (1) by means of synchronous motors; of vertical translation along the axis V of the head (200) by means of a synchronous motor; of rotation about the axis θ (theta) of the head (300) by means of a synchronous motor; of actuation of the flow control element (302) of the nozzle (301) so as to allow the process for the extrusion of the spacer profile (7) and for the forming of the spacer frame on a glass sheet (1') that has a shape that is other than rectangular because it is a regular or irregular polygonal shape or on a glass sheet (1") that has a shape that is other than rectangular because it is curvilinear or on a glass sheet (1''') that has a shape that is other than rectangular because it contains both rectilinear and curvilinear parts.

The constructive details can be replaced with other technically equivalent ones.

The materials and dimensions may be any according to the requirements in particular arising from the dimensions (base and height) and/or from the shape of the glass sheets (2, 2', 2", 2''', 2M, 2'm, 2"m) which will constitute the insulating glazing unit (1) once the spacer profile (7) has been extruded to form the spacer frame and a second sheet has been coupled and optionally additional spacer frames and glass sheets have been mated.

It goes without saying that the industrial application is assuredly successful, since the lines of machines for manufacturing the insulating glazing unit 1 have developed particularly in the last decade.

Even more so, the dimensions of the peripheral spacer profile, in terms of area of its cross-section, and the extensions of the perimeter of the insulating glazing unit (1), in terms of length, have all increased substantially in view of the architectural evolutions related to the insulating glazing unit.

Today the range of types of insulating glazing units has in fact undergone a surprising increase in quantity and dimensions; it is sufficient to consider structural glazing, which extends over heights of more than one story, or commercial glazing, which reaches lengths of more than fifteen meters and consider that the large dimensions of the surface entail the use of equally important thicknesses of the glass sheets and of the spacer frame.

However, the assortment of automatic lines according to the background art has turned out to be unsuitable for this parallel development of the final product or has solved the problem only partially.

Moreover, two important competitors have respectively developed and engaged in the technology for forming the spacer frame (7) by direct extrusion against the face of the glass sheet, as described in the present application, and both have not solved the requirements of high flow-rate and of continuity thereof in the extrusion of the spacer profile (7) that constitutes the spacer frame apart from palliatives which are not satisfactory and are quite far from the solution described here.

The insertion of the present invention in the line for the production of the insulating glazing unit is shown in FIGS. 13 and 14 (overall view and plan view) by the reference sign (1000).

The invention is of course susceptible of numerous modifications and variations, all of which are within the scope of the same appended claims.

The materials used, as well as the dimensions that constitute the individual components of the invention, may of course be more pertinent according to the specific requirements.

The characteristics indicated as advantageous, convenient or the like may also be omitted or be replaced with equivalents.

What is claimed is:

1. A dosage device for extruding a monocomponent or bicomponent polymeric product, for an automatic machine for forming a spacer frame, said dosage device comprising: a first dosage assembly and a separate second dosage assembly configured for dosage and feeding of said product, and a controller configured to communicate with an operator interface disposed on a control post, said controller being configured to activate the first dosage assembly and the second dosage assembly alternately such that one of the first dosage assembly and the second dosage assembly is configured to provide continuity of flow to an extrusion nozzle while the other of the first dosage assembly and the second dosage assembly is configured to reload, said first and second dosage assemblies being activatable and dispensed, simultaneously, jointly, and complimentary wherein said controller is configured to activate the first dosage assembly and the second dosage assembly such that one of the first dosage assembly and the second dosage assembly includes a flow-rate ramp that passes from a steady-state value to zero and the other of the first dosage assembly and the second dosage assembly is complimentary such that the other of the first dosage assembly and the second dosage assembly includes a flow-rate ramp that passes from zero to the steady-state value, wherein each one of said first dosage assembly or said second dosage assembly that is taking over is configured to align its own pressure with the pressure of said dosage assembly that is quitting, by means of actuations of synchronous electric motors provided with feedback by first and second pressure transducers arranged individually downstream of said first and second dosage assemblies and separated from said first and second dosage assemblies and said first and second pressure transducers are each arranged upstream at least one valve, the at least one valve being configured to swap the dosage assemblies, wherein the at least one valve is a three-way valve and/or a two-way valve and/or a one-way valve type, wherein the first pressure transducer monitors the pressure of the first dosage assembly and the second pressure transducer monitors the pressure of the second dosage assembly.

2. The dosage device according to claim 1, wherein each one of said first and second dosage assemblies is configured to dose and feed only a base product in a synchronous electrical tie.

3. The dosage device according to claim 1, wherein if a bicomponent product is used, each one of said first and second dosage assemblies doses and feeds one of said base products and a catalyst product, which are processed by means of a synchronous electrical tie, so that said base product and said catalyst product are dispensed in the required stoichiometric ratio.

4. The dosage device according to claim 1, wherein said flow-rate ramps are configured to respectively increase for one of said second or first dosage assembly that is taking over and decrease for the other of said first or second dosage assembly that is quitting, are linear.

5. The dosage device according to claim 1, wherein a pressure of said second dosage assembly is configured to equalize, wherein said flow-rate ramp is configured to pass from the steady-state value to zero, in said first dosage assembly and said flow-rate ramp is configured to pass from the zero value to the steady-state value in said second dosage assembly, the equalization of said pressure is configured to occur by means of motors, which are provided with feedback by means of transducers.

6. The dosage device according to claim 1, wherein said first and second dosage assemblies are disposed on a carriage in order to shorten a path of said product.

7. The dosage device according to claim 1, wherein said first and second dosage assemblies include a plurality of connection circuits, the plurality of connection circuits having flow controls of which, with respect to said extrusion nozzle, are substantially of the three-way valve and/or two-way valve and/or one-way valve type.

8. The dosage device according to claim 1, wherein said monocomponent or bicomponent polymeric product is configured to be dosed and fed to said extrusion nozzle through said joined first and second dosage assemblies, each of which is configured to dose and feed simultaneously said base product and optionally said catalyst product, said first and second dosage assemblies having a plurality of syringes and/or pistons and cylinders, said first and second dosage assemblies being adapted to provide continuity of flow by alternating, dispensing to said extrusion nozzle said base product and possibly said catalyst product while one is configured to extrude and the other is configured to reload, being close to depletion.

9. The dosage device according to claim 1, wherein said product is configured to be dosed and fed to said extrusion nozzle through said joined first and second dosage assemblies, each of which is configured to dose and feed simultaneously said base product and said catalyst product, said first and second dosage assemblies having a plurality of syringes and/or pistons and cylinders said first and second dosage assemblies being adapted to provide continuity of flow, wherein said flow-rate ramps are mutually complementary so that said flow-rate ramp of said dosage assembly is configured to pass from the steady-state value to zero and complementarily said flow-rate ramp of said joint second dosage assembly is configured to pass from zero to the steady-state value, and vice versa.

10. The dosage device according to claim 1, wherein said flow-rate ramps are configured to respectively increase for one of said second or first dosage assembly that is taking over and decrease for the other of said first or second dosage assembly that is quitting, are non-linear.

11. The dosage device according to claim 1, wherein said controller is also configured to correct a displacement of the first and second dosage assemblies to compensate for a compressibility of the product according to an instant pressure.

* * * * *